United States Patent
Müller et al.

(10) Patent No.: US 10,545,659 B2
(45) Date of Patent: Jan. 28, 2020

(54) METHOD FOR OPERATING AN OPERATOR CONTROL DEVICE OF A MOTOR VEHICLE IN MULTI-FINGER OPERATION

(71) Applicant: AUDI AG, Ingolstadt (DE)

(72) Inventors: Ulrich Müller, Ingolstadt (DE); Michael Wachinger, Winkelhausen (DE); Tim Krämer, Eitensheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/505,838

(22) PCT Filed: Oct. 31, 2015

(86) PCT No.: PCT/EP2015/002192
§ 371 (c)(1),
(2) Date: Feb. 22, 2017

(87) PCT Pub. No.: WO2016/096065
PCT Pub. Date: Jun. 23, 2016

(65) Prior Publication Data
US 2017/0277385 A1 Sep. 28, 2017

(30) Foreign Application Priority Data
Dec. 18, 2014 (DE) .................. 10 2014 019 040

(51) Int. Cl.
*G06F 3/0488* (2013.01)
*G06F 3/041* (2006.01)

(52) U.S. Cl.
CPC .......... *G06F 3/0488* (2013.01); *G06F 3/0414* (2013.01); *B60K 2370/143* (2019.05);
(Continued)

(58) Field of Classification Search
CPC .................. G06F 3/0488; G06F 3/0414; G06F 2203/04104; G06F 2203/04105;
(Continued)

(56) References Cited

U.S. PATENT DOCUMENTS

2007/0152976 A1* 7/2007 Townsend ............. G06F 3/0416
345/173
2008/0168403 A1 7/2008 Westerman et al.
(Continued)

FOREIGN PATENT DOCUMENTS

CN 102479040 A 5/2012
CN 102566865 A 7/2012
(Continued)

OTHER PUBLICATIONS

German Office Action dated Aug. 17, 2015, from German Patent Application No. 10 2014 019 040.4, 5 pages.
(Continued)

*Primary Examiner* — David S Posigian
(74) *Attorney, Agent, or Firm* — Staas & Halsey LLP

(57) ABSTRACT

A number of objects simultaneously touching a touch-sensitive operator control unit of an operator control apparatus are detected and a trigger position at which one of the number of objects detected touches the touch-sensitive operator control unit is determined. When more than one object touches the touch-sensitive operator control unit, a touch pressure with which the touch-sensitive operator control unit is acted on overall by the number of objects detected is compared to a predefined pressure threshold value. A function of the motor vehicle, assigned to the trigger position, is triggered if the touch pressure is higher than the predefined pressure threshold value. The predefined pressure threshold value is defined in a manner dependent on the number of objects detected.

14 Claims, 4 Drawing Sheets

(52) U.S. Cl.
CPC ............ *B60K 2370/1442* (2019.05); *B60K 2370/1472* (2019.05); *G06F 2203/04104* (2013.01); *G06F 2203/04105* (2013.01); *G06F 2203/04808* (2013.01)

(58) Field of Classification Search
CPC .......... G06F 2203/04808; G01L 5/226; H03K 17/9625; H03K 17/964; B60K 2350/1024–1036; B60K 2350/1052; B60K 2370/10–186
See application file for complete search history.

(56) References Cited

U.S. PATENT DOCUMENTS

| | | | |
|---|---|---|---|
| 2011/0141053 A1* | 6/2011 | Bulea | G06F 3/0416 345/174 |
| 2011/0248948 A1 | 10/2011 | Griffin et al. | |
| 2011/0304550 A1 | 12/2011 | Romera Jolliff et al. | |
| 2012/0019469 A1* | 1/2012 | Westerman | G06F 3/04883 345/173 |
| 2013/0063389 A1 | 3/2013 | Moore | |
| 2013/0093715 A1* | 4/2013 | Marsden | G06F 3/044 345/174 |
| 2014/0104225 A1* | 4/2014 | Davidson | G06F 3/044 345/174 |
| 2014/0237408 A1 | 8/2014 | Ohlsson et al. | |
| 2014/0368455 A1* | 12/2014 | Croisonnier | G06F 3/0414 345/173 |
| 2015/0022461 A1* | 1/2015 | Kempin | G06F 3/04883 345/173 |
| 2015/0169125 A1* | 6/2015 | Ito | G06F 3/0487 345/173 |
| 2015/0217781 A1* | 8/2015 | Lee | B60W 50/10 701/1 |
| 2016/0188181 A1* | 6/2016 | Smith | G06F 3/0414 715/765 |

FOREIGN PATENT DOCUMENTS

| | | | |
|---|---|---|---|
| CN | 103513882 A | 1/2014 | |
| CN | 103543864 A | 1/2014 | |
| CN | 103902129 A | 7/2014 | |
| DE | 10 2008 051 051 A1 | 3/2010 | |
| DE | 10 2014 019 040.4 | 12/2014 | |
| WO | 2005/057546 A1 | 6/2005 | |
| WO | 2012/138404 A2 | 10/2012 | |
| WO | 2012/138404 A3 | 10/2012 | |
| WO | 2013/017245 A1 | 2/2013 | |
| WO | 2014/105276 A1 | 7/2014 | |
| WO | WO-2014105275 A1 * | 7/2014 | G06F 3/016 |
| WO | 2014/139632 A1 | 9/2014 | |
| WO | PCT/EP2015/002192 | 10/2015 | |

OTHER PUBLICATIONS

International Search Report dated Feb. 19, 2016, from International Patent Application No. PCT/EP2015/002192, 2 pages.
English Translation of the International Preliminary Report on Patentability dated Jun. 29, 2017 from International Patent Application No. PCT/EP2015/002192, 7 pages.
Chinese Office Action dated Aug. 1, 2019 from Chinese Patent Application No. 201580043606.6, with English translation of summary of Examiner's comments, 16 pages.
German Office Action dated Nov. 27, 2019 from German Patent Application No. 10 2014 019 040.4, and machine-generated English translation thereof, 16 pages.

* cited by examiner

METHOD FOR OPERATING AN OPERATOR CONTROL DEVICE OF A MOTOR VEHICLE IN MULTI-FINGER OPERATION

CROSS REFERENCE TO RELATED APPLICATIONS

This application is a U.S. national stage of International Application No. PCT/EP2015/002192, filed on Oct. 31, 2015. The International Application claims the priority benefit of German Application No. 10 2014 019 040.4 filed on Dec. 18, 2014. Both the International Application and German Application are incorporated by reference herein in their entirety.

BACKGROUND

Described herein is a method for operating an operator control apparatus of a motor vehicle. Also described herein are an operator control apparatus and a motor vehicle having the operator control apparatus.

Touch-sensitive operator control units or touchpads are already known from the related art and are used for example in laptops in order to control or select functions of the laptop. The touchpad can thus determine a position of a finger by which a user touches the touchpad, thus permitting interaction with content on the screen of the laptop. For this purpose, it is for example possible for a mouse pointer on the screen to be controlled by virtue of the user using his or her finger to touch the touchpad. U.S. Patent Application Publication No. 2011/0304550 A1 describes an operator control unit which is designed for providing multiple input methods, for example an input using a finger or using an input stylus, and for adapting a configuration of the operator control unit to the present input method.

Such touchpads are increasingly also used in motor vehicles, such that a user, for example the driver of the motor vehicle, can control functions of the motor vehicle, for example infotainment components, a navigation system or a telephone. In general, such touchpads have such a large touch-sensitive surface that they can also be touched by way of two or more fingers. This may also occur inadvertently if the driver, for example during travel, is concentrating on controlling the motor vehicle and, at the same time, inadvertently touches the touchpad by way of more than one finger. This can give rise to deviations between the desired input and the actual input on the touchpad.

It is also known from the related art for touchpads to be combined with a force sensor arrangement which determines a finger force of the user, that is to say a pressure which the user exerts on the touchpad by way of his or her finger. For example, German Patent Application No. 10 2008 051 051 A1 presents an operator control device having a pressure-sensitive surface, and describes that an enlargement factor for the display of a list is varied by pressing on the pressure-sensitive surface with varying intensity.

Triggering of a function by way of an actuating force or an actuating pressure is possible by way of the pressure detection. This means that the user can highlight a function for example by way of a sliding movement over the touchpad and can select the function by way of a pressing action. Thus, the behavior of a mechanical button can be simulated. Only when pressure is exerted on the touchpad is the respective function triggered. To further improve the subjective impression of quality during the actuation, a mechanical haptic impulse, for example a vibration, may be generated by way of an actuator. Furthermore, it is also possible for a tone, for example a click sound, to be generated by way of a loudspeaker during an actuation. The touchpad thereby has virtually the same feel as a mechanical button during the actuation.

SUMMARY

Described herein is a solution by way of which more pleasant and more reliable operator control of an operator control apparatus can be made possible, and by way of which instances of erroneous operator control can be avoided.

This may be achieved according to the disclosure herein by way of a method described below, an operator control apparatus capable of implementing the method, and a motor vehicle having the operator control apparatus. The description and the figures described herein relate to advantageous embodiments.

A method described herein serves for the operation of an operator control apparatus of a motor vehicle. The method includes the detection of a number of objects by way of which a touch-sensitive operator control unit is simultaneously touched. The method also includes the determination of a position at which, in the case of only one touching object, the operator control unit is touched by way of the single object, or the definition of a triggering object and the determination of a position of the triggering object on the touch-sensitive operator control unit in a manner dependent on respective touch signals which, in the case of more than one touching object, are generated owing to the simultaneous touching of the objects. Furthermore, the method includes the predefinition of a pressure threshold value in a manner dependent on the detected number of objects, the detection of a pressure with which the touch-sensitive operator control unit is acted on overall during the touching, the determination of whether the detected pressure is higher than the predefined pressure threshold value, and the triggering of a function, assigned to the detected position, of the motor vehicle only if the detected pressure is higher than the predefined pressure threshold value.

Functions of the motor vehicle, for example infotainment functions of the motor vehicle, can be selected and/or triggered and/or controlled by a user, in particular the driver of the motor vehicle, by way of the operator control apparatus. The operator control apparatus has a touch-sensitive operator control unit which may for example be in the form of a touch-sensitive surface or in the form of a touchpad, and which can implement touch sensitivity by way of functional principles that are known per se.

The touch-sensitive operator control unit is designed to determine the number of objects by way of which the touch-sensitive operator control unit is touched simultaneously. The objects may include fingers of a hand used by the user to operate the operator control apparatus, or a ball of the hand. If the touch-sensitive operator control unit is touched by way of only one object, for example by way of only one finger, the touch-sensitive operator control unit identifies the position of the object on the touch-sensitive operator control unit. If the touch-sensitive operator control unit is touched by way of more than one object, for example by way of multiple fingers, the touch-sensitive operator control unit firstly determines, on the basis of respective touch signals of the objects, which of the objects is intended for the triggering and/or selection and/or control of the operator control apparatus by the user. The object is defined as the triggering object. Furthermore, the position of the triggering object is determined. In this way, it is possible to identify which object is intended to trigger and/or select and/or control the function, if the user inadvertently places multiple objects on the touch-sensitive operator control surface. It is thus possible to distinguish the actuating object from the resting objects.

Furthermore, a pressure which is exerted on the touch-sensitive operator control unit by the object or by the objects collectively is detected, for example by way of a pressure sensor. For example, an overall pressure is detected, that is to say, even in the case of more than one touching object, the pressure exerted by all of the objects on the touch-sensitive operator control unit is determined. It is thus advantageously not necessary to provide multiple pressure sensors which locally determine the pressure exerted on the touch-sensitive operator control unit by each object individually. In this way, the method is made particularly simple, because only the signal of one pressure sensor has to be processed.

Furthermore, it is provided that the function assigned to the determined position is triggered only if the detected pressure exceeds a predefined pressure threshold value, that is to say if the exerted pressure is higher than the predefined pressure threshold value. The predefined pressure threshold value may also be referred to as a triggering threshold. To trigger the function, it is thus provided that the user applies to the touch-sensitive operator control unit a pressure or a triggering pressure which exceeds the triggering threshold. The predefined pressure threshold value is changed or varied in a manner dependent on a number of detected objects. In other words, this means that one pressure threshold value is predefined if the user touches the touch-sensitive operator control unit by way of only one object or only one finger, and other pressure threshold values may be predefined if it is detected that the user touches the touch-sensitive operator control unit by way of more than one object or more than one finger.

By way of the method described herein, the driver can operate an operator control apparatus easily and without instances of erroneous operator control, and can control the desired function even if he or she operates the operator control apparatus by way of more than one finger, in particular inadvertently.

It may be provided that in each case one electrical capacitance between the touch-sensitive operator control unit and the respective objects is detected as a respective touch signal. For this purpose, the touch-sensitive operator control unit may include electrodes which form a grid and which form in each case a capacitor together with the respective touching objects at the respective position. Each of the capacitors has a respective electrical capacitance which can be determined or measured by way of the touch-sensitive operator control unit. In this way, it is possible to particularly easily determine a position of the objects on the touch-sensitive operator control unit.

In a refinement, out of the number of detected objects, that object whose touch signal exhibits the greatest signal strength is determined as the triggering object. In general, the user exerts the strongest touch signal on the touch-sensitive operator control unit by way of the object at that position which is assigned to the function that the user wishes to operate. The object is defined as the triggering object. In other words, this means that the user presses most intensely by way of the object which is intended to operate the function. Here, it is in particular the case that the other objects merely rest on the touch-sensitive operator control unit. If an electrical capacitance is detected as the touch signal, that object which forms the greatest capacitance with the electrodes of the touch-sensitive operator control unit is defined as the triggering object. An electrical capacitance is in particular dependent on an electrode area. Here, in general, that object which presses most intensely on the touch-sensitive surface, and in the process is "pressed flat", has the greatest electrode area. It is thus possible for the triggering object to be particularly easily identified even without a local absolute pressure measurement.

In a further advantageous embodiment, out of the number of detected objects, that object whose touch signal exhibits the greatest change in signal strength is determined as the triggering object. Here, it is the case in particular that a change of the signal strength with respect to time is detected. If an electrical capacitance is detected as the touch signal, a change in capacitance with respect to time is detected. Since, as already described, the capacitance is dependent on an electrode area, it is the case in particular that a change in the electrode area results in a change in the capacitance. In particular, the electrode area changes because a touch area of the actuating object, and thus the electrode area of the actuating object during the touching, is enlarged owing to the fact that the object is "pressed flat". In other words, this means that the object forms a smaller electrode area at the time of touching than at a later time at which the user presses the object onto the touch-sensitive operator control unit.

A further advantageous refinement provides that each number of objects is assigned in each case one pressure value, wherein one of the pressure values is predefined as the pressure threshold value in a manner dependent on the detected number of objects. For example, five pressure values may be predefined which correspond to the detected number of fingers of a hand by way of which the touch-sensitive operator control surface is touched. It is thus possible for the pressure threshold value to be set particularly exactly depending on how many fingers the user uses to touch the touch-sensitive operator control unit during actuation.

It has proven to be advantageous for the pressure value to be increased with an increasing number of objects. Here, the method is based on the realization that any object, even if it is not actively pressing on the touch-sensitive operator control unit but is merely resting thereon, exerts a certain resting pressure on the touch-sensitive operator control unit. Thus, the greater the number of objects lying on the touch-sensitive operator control unit, the greater the resting pressure. Now, if the pressure threshold value were not adapted to the detected number of objects, a user touching the operator control unit by way of multiple objects would need to exert a lower pressure by way of the actuating object than if he or she were to touch and actuate the operator control unit by way of only one object, because a certain resting pressure is already exerted on the touch-sensitive operator control unit by the resting objects. This could result in instances of erroneous operator control. For this reason, the pressure threshold value is increased the greater the number of objects that are touching the touch-sensitive operator control unit. This means that the actuating object must exert a greater pressure or a greater force the more objects resting on the touch-sensitive operator control unit are detected.

In a further advantageous embodiment, a first pressure value is predefined as the pressure threshold value if the touch-sensitive operator control unit is touched by way of exactly one object, and a second pressure value is predefined as the pressure threshold value if the touch-sensitive operator control unit is touched by way of more than one object, wherein the first pressure value is lower than the second pressure value. In this embodiment, a distinction is made only between situations in which the user touches the touch-sensitive operator control unit by way of a single object and in which the user touches the touch-sensitive operator control unit by way of more than one object. Here, the first pressure value may for example amount to approximately 3 N, and the second pressure value may for example amount to approximately 5 N. The method is thus made particularly simple.

The operator control apparatus described herein for a motor vehicle includes a touch-sensitive operator control unit which is designed to detect a number of objects by way of which the touch-sensitive operator control unit is simultaneously touched, to determine a position at which, in the case of only one touching object, the operator control unit is touched by way of the single object, and to define a triggering object, and to determine a position of the triggering object on the touch-sensitive operator control unit in a manner dependent on respective touch signals which, in the case of more than one touching object, are generated owing to the simultaneous touching of the objects. Furthermore, the operator control apparatus may include a detection device for detecting a pressure with which the touch-sensitive operator control unit is acted on overall during the touching, and a control device for predefining a pressure threshold value in a manner dependent on the detected number of objects, for determining whether the detected pressure is higher than the predefined pressure threshold value, and for triggering a function, assigned to the detected position, of the motor vehicle only if the detected pressure is higher than the predefined pressure threshold value. The detection device may for example include a pressure sensor. The control device can also be a control unit of the motor vehicle which is designed to communicate with the detection device and/or with the touch-sensitive operator control unit.

The motor vehicle described herein includes the operator control apparatus described herein or an advantageous embodiment of the operator control apparatus. The motor vehicle may be in the form of a passenger motor vehicle.

The preferred embodiments and the advantages thereof presented with reference to the method described herein apply correspondingly to the operator control apparatus described herein and to the motor vehicle described herein, wherein the operator control apparatus has, in particular, features for carrying out the method.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
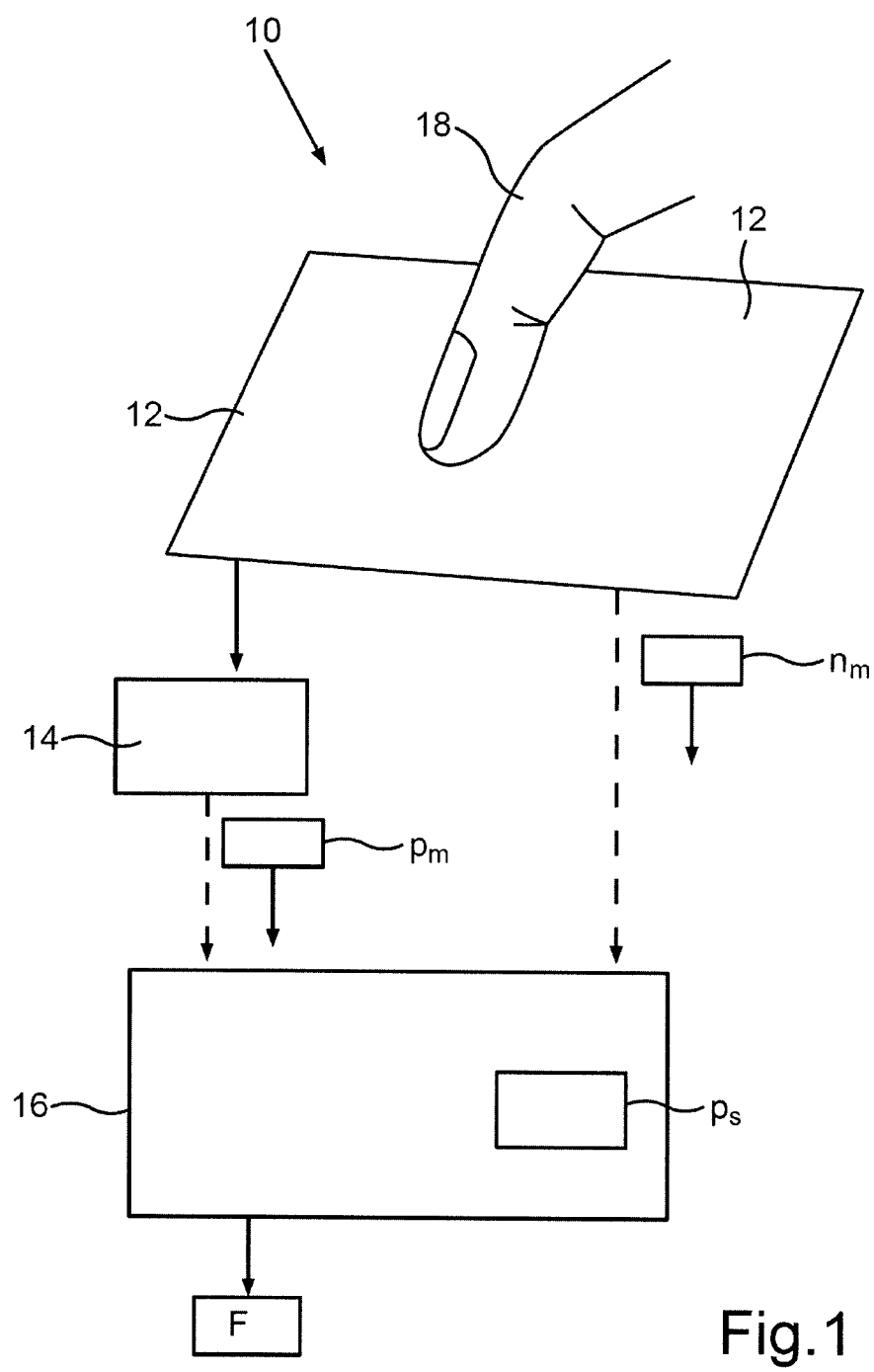
FIG. 1 is a schematic illustration of an embodiment of an operator control apparatus described herein during operator control by way of only one finger.

Reference will now be made in detail to the preferred embodiments, examples of which are illustrated in the accompanying drawings, wherein like reference numerals refer to like elements throughout.

Exemplary embodiments are discussed below with reference to the drawings. In the exemplary embodiments, it is however the case that the described components of the embodiments each constitute individual features which can be considered independently of one another, and each also develop the disclosure independently of one another and are thus also to be regarded either individually or in any combination other than that presented. Furthermore, the described embodiments may also be supplemented by further features that have already been described.

Figure 4:
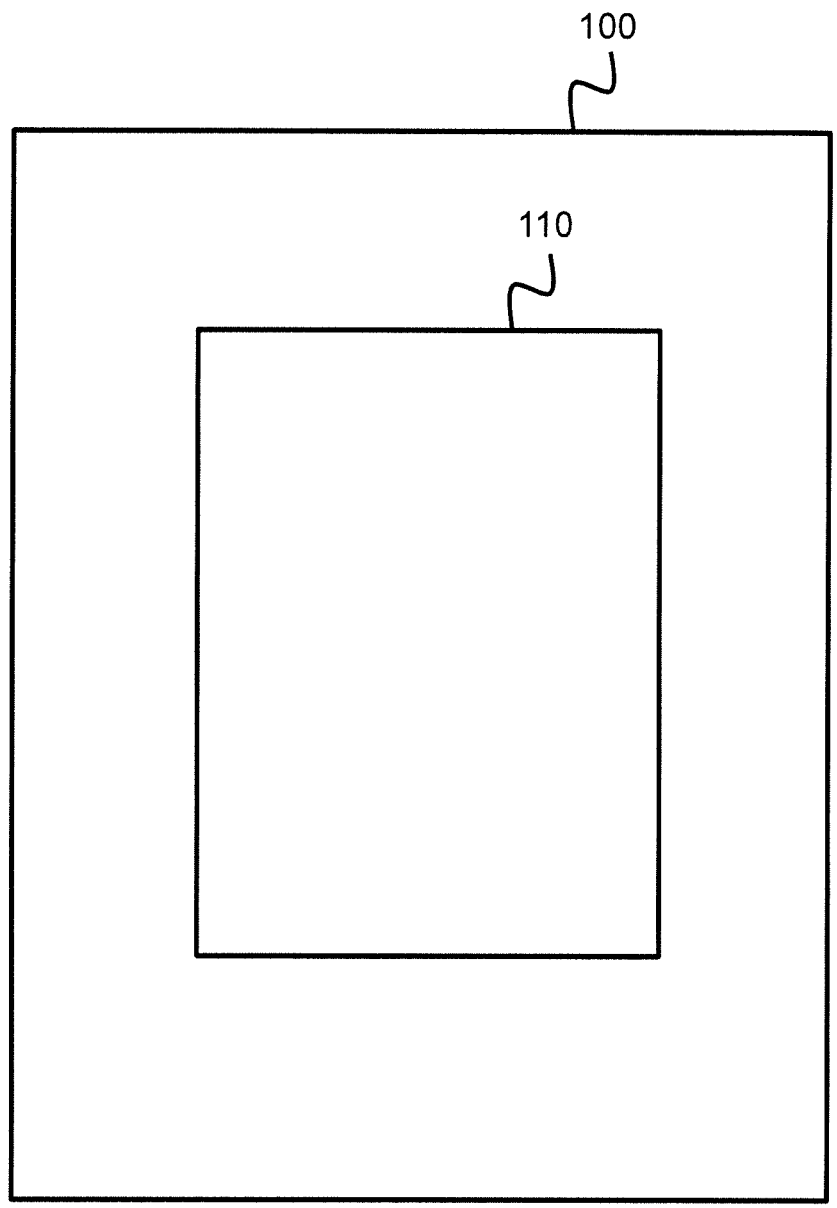
FIG. 4 is a box diagram of a motor vehicle.

FIG. 1 shows an operator control apparatus 10 for the selection and/or triggering and/or control of functions F of a motor vehicle (not illustrated here). Such functions F may for example be a navigation system of the motor vehicle, a multimedia device, an infotainment system, a so-called car menu, which can be displayed on a display unit (not shown here) of the motor vehicle, or a hands-free device of the motor vehicle. FIG. 4 shows a box diagram of a motor vehicle 100 in which the operator control apparatus 10 may be provided. The motor vehicle 100 includes a chassis 110.

The operator control apparatus 10 may for example be provided in a central console, such that it can be easily operated in particular by a driver of the motor vehicle. Here, the operator control apparatus 10 has a touch-sensitive operator control unit 12, a detection device 14 and a control device 16. The detection device 14 may for example be in the form of a pressure sensor such as is known per se. The control device 16 may also be a control unit of the motor vehicle which is designed to communicate with the touch-sensitive operator control unit 12 and/or with the detection device 14 of the operator control apparatus 10.

The touch-sensitive operator control unit 12 is designed to detect a number $n_m$ of objects by way of which the touch-sensitive operator control unit 12 is touched. The touch-sensitive operator control unit 12 may, for example, be operated by the user by way of his or her fingers. Thus, the fingers of the user are detected as the touching objects.

Here, the touch-sensitive operator control unit 12 is touched by way of exactly one finger 18. Here, the number $n_m$ of objects is thus one. The number $n_m$ is made available to the control device 16. Furthermore, the touch-sensitive operator control unit 12 is designed to detect a position at which the touch-sensitive operator control unit 12 is touched by way of the finger 18. This may be realized for example by way of the measurement of a capacitance that the finger 18 forms with the touch-sensitive operator control unit 12 at the position.

The detection device 14 is designed to detect a pressure $p_m$ that the finger 18 exerts on or applies to the touch-sensitive operator control unit 12. The pressure $p_m$ detected by the detection device 14 is made available to the control device 16.

The control device 16 is designed to determine a pressure threshold value $p_s$ in a manner dependent on the detected number $n_m$. The control device 16 compares the pressure $p_m$ detected by the detection device 14 with the presently predefined pressure threshold value $p_s$. The control device 16 is designed to select and/or trigger and/or control the function F if the detected pressure $p_m$ exceeds the pressure threshold value $p_s$. The function F is thus selected and/or triggered and/or controlled only if, during the operator control of the operator control apparatus 10 or of the touch-sensitive operator control unit 12, the finger 18 exerts on the touch-sensitive operator control unit 12 a pressure $p_m$ which exceeds the pressure threshold value $p_s$, that is to say a triggering threshold.

Here, the functions F may be assigned to defined positions on the touch-sensitive operator control unit 12. For this purpose, it is for example possible for labels or symbols (not illustrated here) to be displayed on the touch-sensitive operator control unit 12, which labels or symbols describe the function F assigned to the respective defined position. The user thus exerts the pressure $p_m$ on the touch-sensitive operator control unit 12 at the assigned position provided with the label. If the pressure $p_m$ exceeds the pressure threshold value $p_s$, the associated function F is triggered.

It may however also be provided that the positions, assigned to the functions F, on the touch-sensitive operator control unit 12 arise from an interaction of the touch-sensitive operator control unit 12 with a display unit (not illustrated here) of the motor vehicle. For example, a mouse pointer may be controlled on the display unit by touching the touch-sensitive operator control unit 12, and the touch-sensitive operator control unit 12 is pressed with the triggering pressure when the mouse pointer is situated at the desired position on the display element. It is thus possible for a function displayed on the display unit to be highlighted by way of the mouse pointer and selected and/or triggered by pressing the touch-sensitive operator control unit 12. In this case, the touch-sensitive operator control unit 12 is thus operated in the manner of a touchpad known per se.

It is however also possible for the touch-sensitive operator control unit 12 to be divided into regions, wherein it is for example provided that, in a first region, the touch-sensitive operator control unit 12 is operated in the manner of a touchpad known per se, by virtue of the touch-sensitive operator control unit 12 interacting with the display unit. In a second region of the touch-sensitive operator control unit 12, it is for example possible for labels to be provided at absolute positions, wherein, by pressing the operator control unit 12 at one of the absolute positions, the assigned defined function can be triggered. The positions, assigned to the predefined or defined functions, in the second region are also referred to as so-called preset buttons. A preset button of the type may for example be a menu button, by way of which a menu situation can be accessed on the display unit, or a navigation button, which can be used, for example, to exit a menu situation displayed on the display unit.

Figure 2:
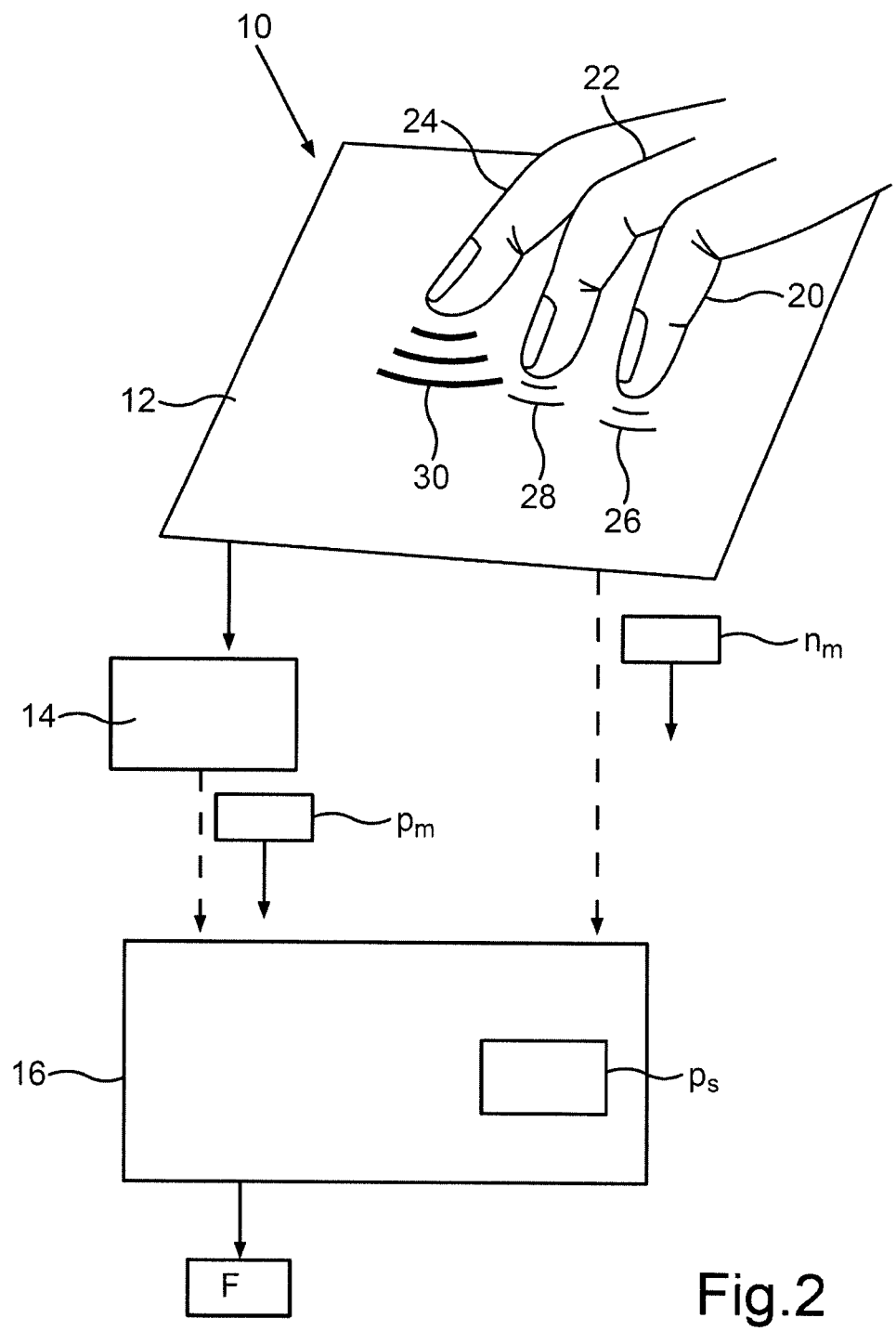
FIG. 2 is a schematic illustration of an embodiment of an operator control apparatus described herein during operator control by way of multiple fingers.

FIG. 2 shows the operator control apparatus 10 from FIG. 1. Here, the touch-sensitive operator control unit 12 of the operator control apparatus 10 is touched by way of three fingers 20, 22 and 24. The touch-sensitive operator control unit 12 is designed to detect the number $n_m$ of fingers, which in this case is three. The number $n_m$ is made available to the control device 16, which determines the pressure threshold value $p_s$ in a manner dependent on the number $n_m$.

Furthermore, the touch-sensitive operator control unit 12 is designed to detect touch signals 26, 28 and 30 of the fingers 20, 22 and 24. The touch signals 26, 28 and 30 may for example be electrical capacitances of respective capacitors which are formed by the touch-sensitive operator control unit 12 as a first electrode and the respective fingers 20, 22, 24 as a respective second electrode. In this exemplary embodiment, it is provided that the finger 24 is intended to actuate the operator control apparatus 10, that is to say the finger 24 presses on the touch-sensitive operator control unit 12. The fingers 20 and 22 merely rest on the touch-sensitive operator control unit 12. Thus, the finger 24 generates a stronger touch signal 30 in relation to the touch signals 26 and 28 of the fingers 20 and 22. Here, the finger 24 therefore generates the strongest touch signal 30 because the finger 24 is "pressed flat" and thereby increases the size of a touch area of the finger 24 on the touch-sensitive operator control unit 12. The finger 24 is in this case defined as a triggering object owing to the strongest touch signal 30. Furthermore, the position in which the triggering object, that is to say the finger 24, touches the touch-sensitive operator control unit 12 is determined by way of the touch-sensitive operator control unit 12.

The detection device 14 determines the pressure $p_m$ that is exerted on the touch-sensitive operator control unit 12 by the fingers 20, 22 and 24 collectively. The pressure $p_m$ is thus determined globally for the entire touch-sensitive operator control unit 12. The pressure $p_m$ detected by the detection device 14 is made available to the control device 16.

The control device 16 compares the pressure $p_m$ detected by the detection device 14 with the presently predefined pressure threshold value $p_s$. The control device 16 is designed to select and/or trigger and/or control the function F if the detected pressure $p_m$ exceeds the pressure threshold value $p_s$.

Here, the pressure threshold value $p_s$ from the exemplary embodiment as per FIG. 2 is in particular higher than the pressure threshold value $p_s$ from the exemplary embodiment as per FIG. 1. Specifically, in the exemplary embodiment as per FIG. 2, it is shown by way of example that the user for example inadvertently touches the touch-sensitive operator control unit 12 by way of multiple fingers 20, 22, 24, but seeks to operate the operator control unit 12 only by way of the finger 24, while the other fingers 20 and 22 merely rest on the operator control unit 12. The multiple resting fingers 20 and 22 however have the effect that an elevated pressure is already exerted on the touch-sensitive operator control unit 12. To now prevent inadvertent operator control or actuation of the operator control apparatus 10, the pressure threshold value $p_s$ is raised the greater the number of fingers detected on the touch-sensitive operator control unit 12 is, such that the actuating finger for triggering the function F has to exert an increased pressure.

Figure 3:
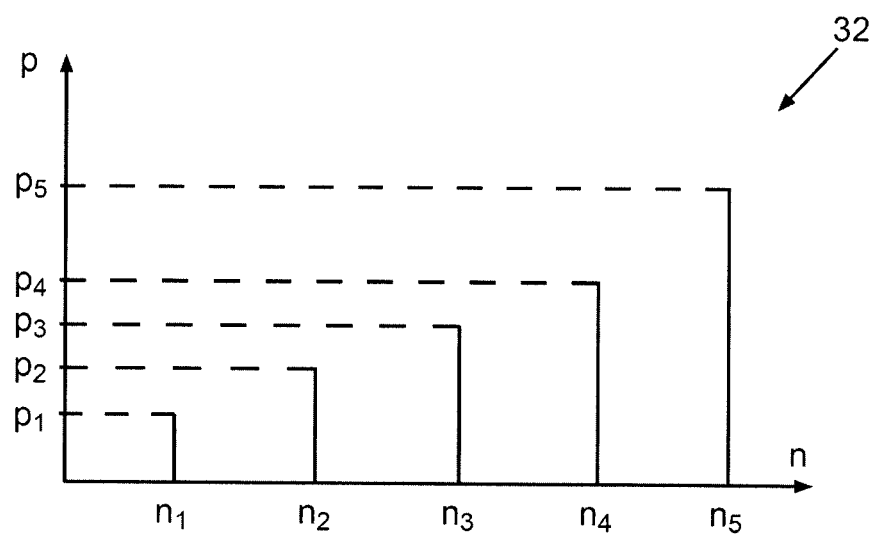
FIG. 3 is a schematic illustration of a diagram in which respective pressure values are assigned to in each case different numbers of fingers used for the operator control of the operator control apparatus.

FIG. 3 shows, by way of example, a diagram 32 in which in each case different numbers $n_1$, $n_2$, $n_3$, $n_4$, $n_5$ of fingers used to operate the operator control apparatus 10 are assigned respective pressure values $p_1$, $p_2$, $p_3$, $p_4$. It is thus the case that a first pressure value p1 is provided as the pressure threshold value $p_s$ if the touch-sensitive operator control unit 12 is touched by way of only one finger, that is to say if the detected number $n_m$ amounts to $n_1=1$. A second pressure value $p_2$ is provided as the pressure threshold value $p_s$ if the touch-sensitive operator control unit 12 is touched by way of two fingers, that is to say if the detected number $n_m$ amounts to $n_2=2$, etc. Here, it is provided that the pressure values $p_1$, $p_2$, $p_3$, $p_4$, $p_5$ are increased with an increasing number of objects $n_1$, $n_2$, $n_3$, $n_4$, $n_5$. One of the pressure values p1, $p_2$, $p_3$, $p_4$, $p_5$ is selected or predefined as the pressure threshold value $p_s$ in a manner dependent on the detected number $n_m$ of objects. This means that the object defined as the triggering object must press more intensely on the touch-sensitive operator control unit 12 the greater the number of objects detected, that is to say the greater the number $n_m$ of detected objects.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for operating an operator control apparatus of a motor vehicle, the method comprising:
   detecting a plurality of objects simultaneously touching a touch-sensitive operator control unit;
   determining, as a triggering object, an object among the plurality of objects detected having a touch signal exhibiting:
      a greatest electrical capacitance by comparing an electrical capacitance of the object with respective electrical capacitances of respective touch signals corresponding to a remaining number of the plurality of objects detected, or
      a greatest change in electrical capacitance by comparing a change in electrical capacitance of the object with respective changes in electrical capacitance of respective touch signals corresponding to the remaining number of the plurality of objects detected;
   determining a trigger position at which the triggering object, among the plurality of objects detected, touches the touch-sensitive operator control unit;
   predefining a pressure threshold value in a manner dependent on a number of the plurality of objects detected;
   determining an overall touch pressure with which the touch-sensitive operator control unit is acted on by all of the plurality of objects detected during the simultaneous touching, the overall touch pressure being a sum of respective pressure values for all of the plurality of objects detected which act on the touch-sensitive operator control unit;
   determining whether the overall touch pressure is greater than the predefined pressure threshold value; and
   triggering a function of the motor vehicle, assigned to the trigger position, when the overall touch pressure is greater than the predefined pressure threshold value.

2. The method as claimed in claim 1, wherein
   in response to detecting the plurality of objects simultaneously touching the touch-sensitive operator control unit:
      determining, by the touch-sensitive operator control unit, an electrical capacitance between electrodes of the touch-sensitive operator control unit and each of the plurality of objects detected, or
      determining, by the touch-sensitive operator control unit, a change in electrical capacitance with respect to time between electrodes of the touch-sensitive operator control unit and each of the plurality of objects detected.

3. The method as claimed in claim 1, wherein
   for a predefined range of a number of objects, a different pressure value is assigned to each of the number of objects in the predefined range, and
   one of the pressure values assigned to the number of objects in the predefined range is predefined as the pressure threshold according to the number of the plurality of objects detected.

4. The method as claimed in claim 3, wherein the pressure values assigned to each of the number of objects in the predefined range increase as the number of objects in the predefined range increase.

5. The method as claimed in claim 1, wherein
   a first pressure value is predefined as the pressure threshold value when the touch-sensitive operator control unit is touched by a first plurality of objects,
   a second pressure value is predefined as the pressure threshold value when the touch-sensitive operator control unit is touched by a second plurality of objects,
   the second plurality of objects is greater in number than the first plurality of objects, and
   the first pressure value is less than the second pressure value.

6. The method as claimed in claim 3, wherein a first difference between two adjacent pressure values assigned in the predefined range is different from a second difference between another two adjacent pressure values assigned in the predefined range.

7. An operator control apparatus for a motor vehicle, the operator control apparatus comprising:
   a touch-sensitive operator control unit configured:
      to detect a plurality of objects simultaneously touching the touch-sensitive operator control unit,
      when the touch-sensitive operator control unit detects the plurality of objects simultaneously touching the touch-sensitive operator control unit, to determine, as a triggering object, an object among the plurality of objects detected having:
         a greatest electrical capacitance by comparing an electrical capacitance of the object with respective electrical capacitances of a remaining number of the plurality of objects detected, or
         a greatest change in electrical capacitance with respect to time by comparing a change in electrical capacitance with respect to time of the object with respective changes in electrical capacitance with respect to time of the remaining number of the plurality of objects detected, and
      to determine a trigger position at which the triggering object, among the plurality of objects detected, touches the touch-sensitive operator control unit;
   a pressure sensor configured to determine an overall touch pressure with which the touch-sensitive operator control unit is acted on by all of the plurality of objects detected during the simultaneous touching, the overall touch pressure being a sum of respective pressure values for all of the plurality of objects detected which act on the touch-sensitive operator control unit; and
   a controller, comprising a processor, configured to predefine a pressure threshold value based on a number of the plurality of objects detected, to determine whether the overall touch pressure is greater than the predefined pressure threshold value, and to trigger a function of the motor vehicle, assigned to the trigger position, when the overall touch pressure is greater than the predefined pressure threshold value.

8. The operator control apparatus as claimed in claim 7, wherein when the touch-sensitive operator control unit detects the plurality of objects simultaneously touching the touch-sensitive operator control unit, the touch-sensitive operator control unit is further configured to determine an electrical capacitance between electrodes of the touch-sensitive operator control unit and each of the plurality of objects detected.

9. The operator control apparatus as claimed in claim 7, wherein when the touch-sensitive operator control unit detects the plurality of objects simultaneously touching the touch-sensitive operator control unit, the touch-sensitive operator control unit is further configured to determine a change in an electrical capacitance with respect to time between electrodes of the touch-sensitive operator control unit and each of the plurality of objects detected.

10. The operator control apparatus as claimed in claim 7, wherein
the controller predefines a first pressure value as the pressure threshold value when the touch-sensitive operator control unit is touched by a first plurality of objects,
the controller predefines a second pressure value as the pressure threshold value when the touch-sensitive operator control unit is touched by a second plurality of objects,
the controller predefines a third pressure value as the pressure threshold value when the touch-sensitive operator control unit is touched by a third plurality of objects,
the second plurality of objects is greater in number than the first plurality of objects,
the third plurality of objects is greater in number than the second plurality of objects, and
the first pressure value is less than the second pressure value, and the second pressure value is less than the third pressure value.

11. A motor vehicle, comprising:
a chassis; and
an operator control apparatus, including:
   a touch-sensitive operator control unit configured:
      to detect a plurality of objects simultaneously touching the touch-sensitive operator control unit,
      when the touch-sensitive operator control unit detects the plurality of objects simultaneously touching the touch-sensitive operator control unit, to determine, as a triggering object, an object among the plurality of objects detected having:
         a greatest electrical capacitance by comparing an electrical capacitance of the object with respective electrical capacitances of a remaining number of the plurality of objects detected, or
         a greatest change in electrical capacitance with respect to time by comparing a change in electrical capacitance with respect to time of the object with respective changes in electrical capacitance with respect to time of the remaining number of the plurality of objects detected, and
      to determine a trigger position at which the triggering object, among the plurality of objects detected, touches the touch-sensitive operator control unit;
   a pressure sensor configured to determine an overall touch pressure with which the touch-sensitive operator control unit is acted on by all of the plurality of objects detected during the simultaneous touching, the overall touch pressure being a sum of respective pressure values for all of the plurality of objects detected which act on the touch-sensitive operator control unit; and
   a controller, comprising a processor, configured to predefine a pressure threshold value based on a number of the plurality of objects detected, to determine whether the overall touch pressure is greater than the predefined pressure threshold value, and to trigger a function of the motor vehicle, assigned to the trigger position, when the overall touch pressure is greater than the predefined pressure threshold value.

12. The motor vehicle as claimed in claim 11, wherein when the touch-sensitive operator control unit detects the plurality of objects simultaneously touching the touch-sensitive operator control unit, the touch-sensitive operator control unit is further configured to determine an electrical capacitance between electrodes of the touch-sensitive operator control unit and each of the plurality of objects detected.

13. The motor vehicle as claimed in claim 11, wherein when the touch-sensitive operator control unit detects the plurality of objects simultaneously touching the touch-sensitive operator control unit, the touch-sensitive operator control unit is further configured to determine a change in an electrical capacitance with respect to time between electrodes of the touch-sensitive operator control unit and each of the plurality of objects detected.

14. The motor vehicle as claimed in claim 11, wherein
the controller predefines a first pressure value as the pressure threshold value when the touch-sensitive operator control unit is touched by a first plurality of objects,
the controller predefines a second pressure value as the pressure threshold value when the touch-sensitive operator control unit is touched by a second plurality of objects,
the controller predefines a third pressure value as the pressure threshold value when the touch-sensitive operator control unit is touched by a third plurality of objects,
the second plurality of objects is greater in number than the first plurality of objects,
the third plurality of objects is greater in number than the second plurality of objects, and
the first pressure value is less than the second pressure value, and the second pressure value is less than the third pressure value.

\* \* \* \* \*